L. A. THORNBURG.
GLASS DRAWING PROCESS AND APPARATUS.
APPLICATION FILED SEPT. 3, 1908.

979,601.

Patented Dec. 27, 1910.

2 SHEETS—SHEET 1.

WITNESSES

INVENTOR,
Lincoln A. Thornburg

L. A. THORNBURG.
GLASS DRAWING PROCESS AND APPARATUS.
APPLICATION FILED SEPT. 3, 1908.
979,601.
Patented Dec. 27, 1910.
2 SHEETS—SHEET 2.
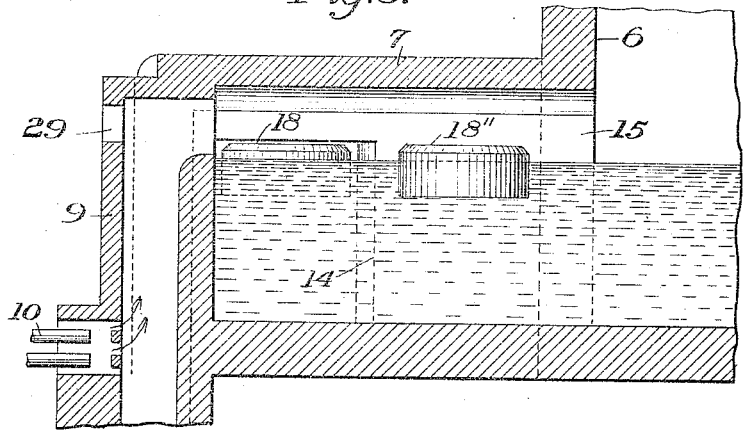
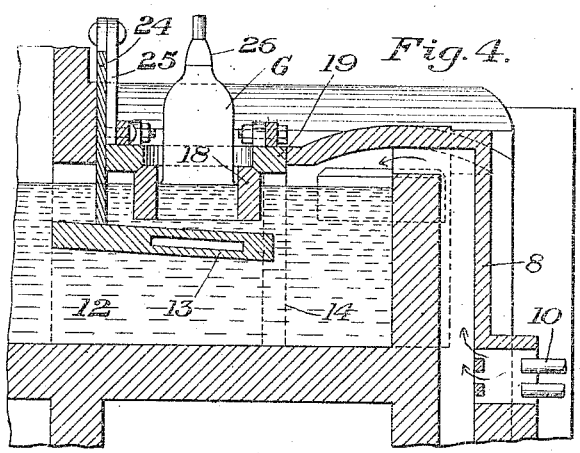
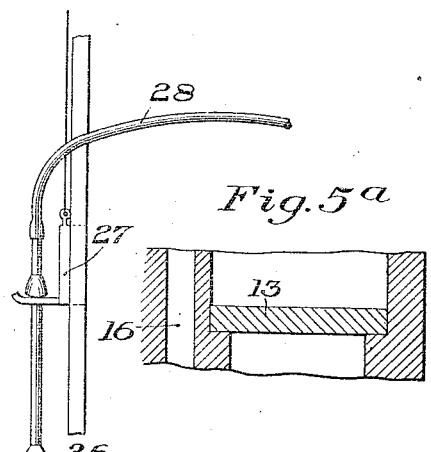
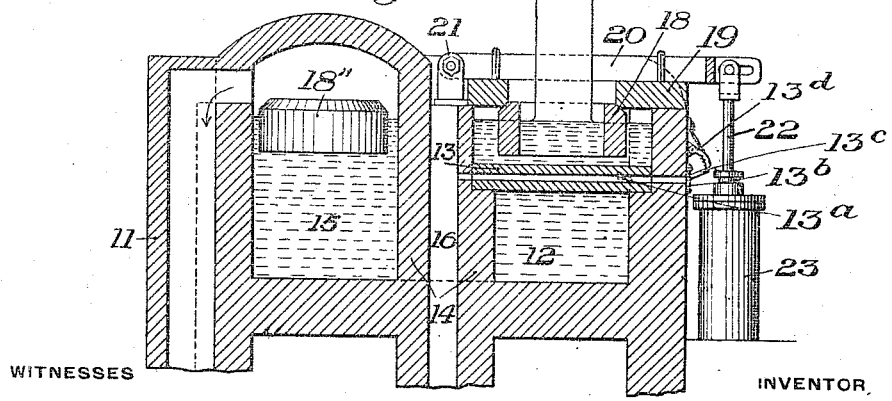
WITNESSES
Walter Tamariss
Fred. Staub
INVENTOR
Lincoln A. Thornburg
By J.W.H. Cle, atty.

UNITED STATES PATENT OFFICE.

LINCOLN A. THORNBURG, OF MUNCIE, INDIANA, ASSIGNOR OF ONE-HALF TO AMERICAN WINDOW GLASS MACHINE COMPANY, OF PITTSBURG, PENNSYLVANIA, A CORPORATION OF NEW JERSEY.

GLASS-DRAWING PROCESS AND APPARATUS.

979,601. Specification of Letters Patent. Patented Dec. 27, 1910.

Application filed September 3, 1908. Serial No. 451,474.

*To all whom it may concern:*

Be it known that I, LINCOLN A. THORNBURG, a citizen of the United States, residing at Muncie, Delaware county, in the State of Indiana, have invented a certain new and useful Glass-Drawing Process and Apparatus, of which the following is a specification.

My invention relates to the art of drawing hollow glass articles such as the cylinders used for making window glass, particularly to the method of drawing from a large body of molten glass, and to the construction of furnaces, etc., for handling the glass for this purpose.

The primary object is to simultaneously attain the various advantages of drawing from a shallow depth, and the advantage of maintaining and melting back in a deep and large volume of glass.

Other objects are to provide improved methods of clearing a drawing vessel of the residue glass left after severing the cylinder; to improve the construction of furnaces and drawing devices and to gain other advantages to hereinafter appear.

I have illustrated the invention in the accompanying drawings, wherein—

Figure 1:
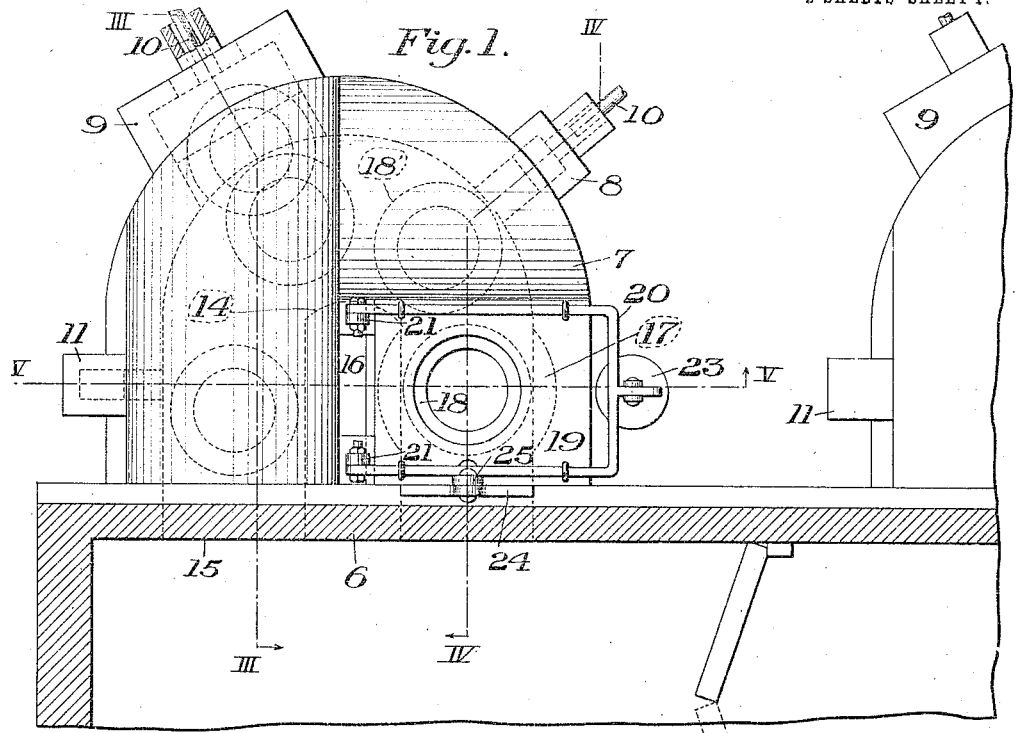
Figure 2:
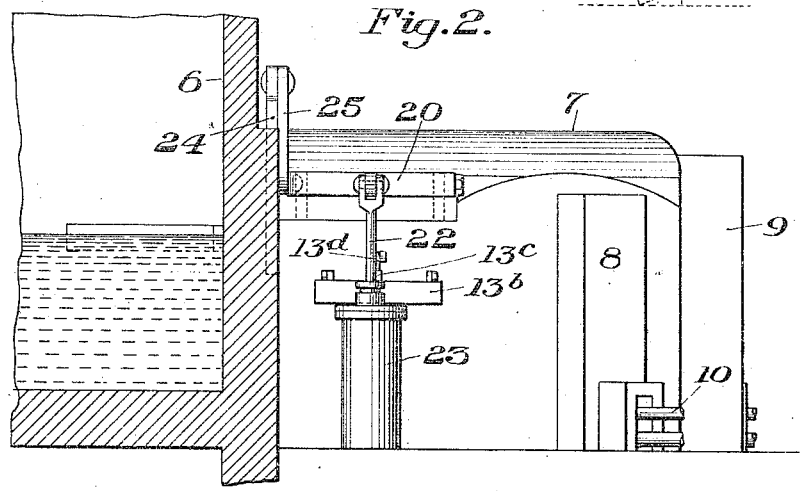

Figure 1 is a partial horizontal section of a melting tank and plan view of one of my improved forehearths or so-called "doghouses." Fig. 2 is a left side elevation of the forehearth, and partial section of the main furnace. Fig. 3 is a vertical section taken on line III, III, in Fig. 1. Fig 4 is a broken vertical section taken on line IV, IV, on Fig. 1. Fig. 5 is a section taken on line 5 in Figs. 1, 3, and 4. Fig. 5ª shows a modified form of the false bottom for the drawing ring.

Experience has shown it to be very difficult to successfully draw a cylinder from a body of glass having any considerable depth, partly because the consistency of the metal cannot be controlled on account of convection currents, radiation from bottom, and other obscure causes which prevent successful production. On the other hand great difficulty is met with when drawing from a shallow pot of glass in melting back the residue, and from improper cooling, etc. Successful and rapid melting back requires a deep body of glass. In my process the cylinder is drawn from what is virtually a shallow body formed by using a floating ring which has a false bottom immersed in a large body of glass while the melting back is effected in a deep body of glass at higher temperature.

Thus in the accompanying drawings I have shown for illustration part of a large melting tank 6, provided with one or more semi-circular forehearths 7 communicating with the main tank by two large openings. This forehearth is preferably heated not only by the radiation but also by flues 8 and 9, containing blow-pipes 10, as shown in Fig. 4, the gases being carried out by a down-take flue 11 shown in Fig. 1. As seen especially in Figs. 4 and 5, there is placed in the inlet opening 12 to the forehearth a refractory tile or block 13, completely submerged in the body of glass and located so that it is comparatively near the surface of the glass, and slants downward back from the mouth of the tank. The passage is enlarged about its center. The body of molten glass in the forehearth is continuous around the central partition 14 and communicates again by the outlet 15 with the main body of glass in the tank. The partition 14 is provided with an opening 16 clear through to the cellar, so that by circulation of air the temperature conditions on both sides of the body of glass surrounding the plate, drawing point and tile 13 may be the same, and this tile may be hollow when desired to better control its temperature, the passage 13ª being covered by a damper 13ᵇ whose handle 13ᶜ can be adjusted by spring catch 13ᵈ. The inleading passage from 12, enlarged as shown at 17 in Fig. 1, forms a drawing chamber above the false bottom block 13. In conjunction with this false drawing bottom I use a series of floating rings 18, 18′, 18″, etc., which are of such depth as to almost reach the block 13 when the rings are in the position in chamber 17 as shown in Fig. 4. It will be seen that by reason of the slope of block 13 the quantity of glass beneath the drawing ring is deeper on the inner side where the glass is apt to be of lower temperature. Covering the drawing chamber is a so-called top stone 19, which as shown in Figs. 1 and 5 I prefer to mount on bars 20 pivoted on hinges 21, and operated to open and close by the piston rod 22 of a cylinder 23. I also provide a refractory gate 24 which may, by means of a link 25, be also operated from the cylinder by the bars 20 supporting the top stone, so that the raising and lowering of the top stone will simultaneously and automatically raise and lower also the gate 24 at the proper time, to shut off the radiation from the tank while drawing.

The drawing rings 18 are preferably beveled to fit in, and be centered by, the top stone 19. When the parts are in the position shown in Figs. 4 and 5, the blow-pipe or bait 26 is lowered through the top stone and into the ring 18, and a cylinder G, is drawn upwardly by the carriage 27 and supplied with air as by the pipe 28, in the well known manner of the Lubbers process.

After the cylinder is of sufficient length it will be understood that the glass is cut off at the bottom and of course a cold residue of glass falls into the ring 18. The top stone 19 is now raised, and incidentally any waste glass or dirt left on it is at once and automatically dumped down the shaft 16. The ring 18 is now pushed backward into the main body of the forehearth carrying the cold glass and skimming the surface, back into the reducing chamber formed in the round part of the forehearth, and being heated not only by the large mass of glass communicating directly with the tank, but also by the flues 8 and 9. The ring containing the residue glass, being thus in a deep body of molten glass of the same temperature as the tank is rapidly and efficiently reduced or cleared, before the ring is eventually pushed out into the tank again by the other rings which follow. Meanwhile the gate 24 being open another one of the rings 18 is pushed into the drawing chamber and over the false bottom 13, bringing in fresh glass from the tank, and thus the process is continued indefinitely.

In case one of the rings 18 becomes broken or is too difficult of clearing, it may be drawn out and dumped down the large intake flue 9; this has a small opening 29 for insertion of a tool. The temperature of the glass in the reducing chamber of the forehearth is preferably kept the same as that in the melting tank, while the drawing point is kept cooler on account of the shallow body, and may be controlled by the air passage 13ª. It will thus be seen that the glass cylinder is drawn from a body of glass which, so far as effects on the drawing are concerned, is shallow and controllable, and yet which by reason of free communication with a large body of glass and by reason of the false bottom 13 being submerged in the large body of glass, is not subject to variations and is as deep as in the big tank, so as not only to keep temperature conditions constant and under control, but to furnish reducing body already at hand, the melting back being done in the deep chamber where the temperature is higher.

The advantages of this method of drawing from a floating ring having a false bottom submerged in the main body of glass, as well as the advantage of melting back the residue immediately in a large body of glass without ever lifting out the receptacle, will readily occur to those familiar with the art; and the construction of the furnace described makes the operation easy, efficient and very uniform and certain.

Having thus described my invention and illustrated its use, what I claim as new and desire to secure by Letters Patent, is the following:

1. The method of forming glass articles which comprises drawing them upwardly from a bath of molten glass and meanwhile controlling the temperature of the glass at a level intermediate between the drawing point and the bottom of the mass of glass.

2. The method of forming glass articles which consists in drawing them upwardly from a bath of molten glass and controlling the flow and temperature of the glass at a level intermediate between the drawing point and the bottom of the mass of molten glass.

3. The process of drawing glass articles which comprises drawing the glass upwardly from a bath of large volume, controlling the flow of glass to the drawing point by an open ring around the same, and controlling the temperature of the glass at a point below the drawing ring but above the bottom of the bath.

4. In the art of drawing glass articles, the method of controlling the flow and temperature of the glass near the drawing point by drawing it under an open ring and over a submerged cooling block placed between the ring and the bottom of the bath, substantially as described.

5. In the art of drawing glass cylinders, the method which comprises flowing the main body of glass into a deep forehearth, drawing the articles in succession from the surface thereof out of open floating rings and controlling the temperature and flow of the glass by means of a submerged plate above the bottom of the bath.

6. In the art of drawing glass articles, the step in the process which comprises successively passing a series of floating rings over a submerged temperature controlling plate, drawing the article from within the ring while it is over the plate, and floating the ring to a different part of the bath for melting out the residue while another article is being drawn from another ring.

7. Apparatus for drawing glass articles comprising the combination of a floating ring in the glass bath, and a submerged false bottom plate under and separated from the ring but placed above the bottom of the bath, substantially as described.

8. The combination with a glass melting tank, of a floating ring therein and means to locally control the currents and temperature beneath the ring while drawing therefrom, and means to successively pass a series of such rings first over and then away from said controlling means.

9. The combination with a glass melting tank having a by-pass connected at both ends to the main body, a small submerged plate at one end of said passage near the surface and a series of rings adapted to float over the plate and through the passage back to the main body of glass.

10. A melting furnace having a curved by-pass channel, an enlarged drawing chamber in the channel provided with a submerged plate therein, and a deep reducing chamber beyond the plate.

11. The combination of a glass working furnace provided with a covered by-pass channel, a submerged plate near the surface of the glass therein at one end, a series of floating rings adapted to pass over said plate, and a deep chamber in the channel for remelting and clearing the rings after drawing.

12. A glass working furnace having a semi-circular forehearth with two openings to the main body of glass, a drawing chamber therein near one opening and a hollow partition wall between said openings.

13. The combination of a furnace having a forehearth with a drawing chamber therein provided with a false bottom and a deeper reducing chamber, of a series of floating rings adapted to pass over the false bottom, and a gate to close the opening to the furnace above the false bottom.

14. The combination with a furnace forehearth, of a drawing chamber, a pivoted top stone thereon, a stop gate for the opening to the furnace, and a power cylinder arranged to simultaneously operate the top stone and gate.

15. A furnace forehearth having a curved channel connected at both ends to the n in furnace body, a drawing chamber in the channel, a hollow wall between said channel ends and a pivoted top stone mounted on the said wall.

16. A furnace having a semicircular forehearth having a continuous channel communicating with the furnace, a drawing chamber therein provided with a false bottom and means to cool the sides and false bottom of said chamber.

17. In a glass drawing apparatus, the combination with a melting tank having a drawing opening therein, of a table or shield located beneath the drawing opening above the bottom of the tank and below the level of the molten glass.

18. In glass drawing apparatus, the combination with a melting tank having a drawing opening therein, of a table or shield made of refractory material, located within the tank below said drawing opening and above the bottom of the tank and means for holding said table submerged.

19. In glass drawing apparatus, the combination with a melting tank having a drawing opening therein, of a table or shield located within the tank in a plane below the working level of the melted glass and above the bottom of the tank whereby the melted glass may have free movement over the table, shield or bench.

In testimony whereof I have hereunto signed my name in the presence of the two subscribed witnesses.

LINCOLN A. $\overset{\text{his}}{\times}$ THORNBURG.
$\phantom{\text{LINCOLN A. }}$ mark Witnesses:
F. W. H. CLAY,
CLARA E. THORNBURG.